(12) United States Patent
Grice et al.

(10) Patent No.: US 12,731,454 B2
(45) Date of Patent: Sep. 8, 2026

(54) SELF-SERVICE KIOSK HAVING A PROGRAMMED DUPLICATE KEY FOB DISPENSER

(71) Applicant: THE HILLMAN GROUP, INC., Forest Park, OH (US)

(72) Inventors: Byron Keith Grice, Phoenix, AZ (US); Michael Kenneth Hart, Tempe, AZ (US); Michael James Schmidt, Gilbert, AZ (US); Brian David Rosner, Phoenix, AZ (US); Ari Bennett, San Francisco, CA (US); Robert Foord, Lakewood, CO (US); Bryan Keith Solace, Chandler, AZ (US)

(73) Assignee: THE HILLMAN GROUP, INC., Forest Park, OH (US)

( * ) Notice: Subject to any disclaimer, the term of this patent is extended or adjusted under 35 U.S.C. 154(b) by 335 days.

(21) Appl. No.: 18/448,198

(22) Filed: Aug. 11, 2023

(65) Prior Publication Data

US 2024/0054849 A1 Feb. 15, 2024

Related U.S. Application Data

(60) Provisional application No. 63/397,595, filed on Aug. 12, 2022.

(51) Int. Cl.

| | |
|---|---|
| ***G07F 17/00*** | (2006.01) |
| ***G06Q 20/18*** | (2012.01) |
| ***G07F 11/70*** | (2006.01) |

(52) U.S. Cl.
CPC ......... *G07F 17/0042* (2013.01); *G06Q 20/18* (2013.01); *G07F 11/70* (2013.01)

(58) Field of Classification Search
CPC ...... G07F 11/04; G07F 17/0042; G07F 11/00; G07F 11/70; G07F 17/42; G07F 17/26; G06Q 20/18
See application file for complete search history.

(56) References Cited

U.S. PATENT DOCUMENTS

| | | | | |
|---|---|---|---|---|
| 10,013,833 | B2 * | 7/2018 | Blalock | G07C 9/00857 |
| 11,922,754 | B2 * | 3/2024 | Muca | B60C 23/0471 |
| 12,251,783 | B2 * | 3/2025 | Robertson | G06V 20/64 |
| 2010/0235905 | A1 * | 9/2010 | Guthery | G07C 9/22 726/19 |
| 2015/0112478 | A1 * | 4/2015 | Bettez | B65H 3/30 700/233 |

(Continued)

*Primary Examiner* — Timothy R Waggoner
(74) *Attorney, Agent, or Firm* — Polsinelli PC

(57) ABSTRACT

A self-service kiosk includes a housing and an imaging device in a key fob receptacle in the housing. The imaging device captures an image of a master key fob placed in the receptacle. The kiosk includes a key fob dispenser having a dispensing slot to receive a duplicated key fob and a dispensing mechanism to dispense the duplicated key fob into the dispensing slot. The kiosk also includes a processor that receives an image from the imaging device, and detects a presence of the master key fob in the key fob receptacle based on an analysis of the received image. Upon detecting the presence of the master key fob, the processor reads codes stored on the master key fob, writes the codes on a blank key fob to generate the duplicated key fob, and causes the dispensing mechanism to dispense the duplicated key fob in the dispensing slot.

20 Claims, 6 Drawing Sheets

(56) References Cited

U.S. PATENT DOCUMENTS

| | | | | |
|---|---|---|---|---|
| 2016/0012660 | A1* | 1/2016 | Yamamiya | G07F 11/04 221/258 |
| 2020/0009925 | A1* | 1/2020 | Zhang | B60C 23/04 |
| 2021/0237175 | A1* | 8/2021 | Robertson | B23Q 35/40 |
| 2022/0139138 | A1* | 5/2022 | Robertson | B23Q 35/40 340/5.22 |
| 2023/0050287 | A1* | 2/2023 | Grice | E05B 19/0011 |

* cited by examiner

SELF-SERVICE KIOSK HAVING A PROGRAMMED DUPLICATE KEY FOB DISPENSER

CROSS-REFERENCE TO RELATED APPLICATION

This application is based on and claims benefit of priority of U.S. Provisional Patent Application No. 63/397,595, filed Aug. 12, 2022, the entire contents of which are incorporated herein by reference.

TECHNICAL FIELD

The present disclosure relates generally to a duplicate key fob dispenser and more particularly to a self-service kiosk having a programmed duplicate key fob dispenser.

BACKGROUND

Users may wish to duplicate one or more programmable master key fobs. Such master key fobs may be used as electronic access keys to enter or exit certain facilities such as office buildings, laboratories, apartment buildings, apartments, or warehouses. A user may wish to duplicate a master key fob to have one or more back up key fobs for use in the event the master key fob is lost or misplaced.

Many retail locations offer key duplication services for manufacturing a duplicate of a physical key. Such retail locations typically include machining centers or kiosks equipped with milling cutters or other cutting devices to generate the required notches on a key blank based on a desired bitting pattern. In some retail locations, such kiosks may also dispense blank key fobs to a user. However, these conventional self-service kiosks do not provide the user with a duplicated key fob that is already programmed with the one or more key codes of a master key fob.

The self-service kiosk of the present disclosure solves one or more of the problems set forth above and/or other problems of the prior art.

SUMMARY

In one aspect, the present disclosure is directed to a self-service kiosk. The self-service kiosk may include a housing and a key fob receptacle disposed in the housing. The self-service kiosk may also include an imaging device positioned in the key fob receptacle. The imaging device may be configured to capture an image of a master key fob placed in the key fob receptacle. Further, the self-service kiosk may include a key fob dispenser configured to receive a duplicated key fob. The self-service kiosk may include a dispensing mechanism configured to dispense the duplicated key fob into the key fob dispenser. The self-service kiosk may also include at least one processor. The at least one processor may be configured to receive the captured image from the imaging device. The at least one processor may also be configured to detect a presence of the master key fob in the key fob receptacle based on an analysis of the received image. Upon detecting the presence of the master key fob, the at least one processor may be configured to read one or more codes stored on the master key fob, write the one or more codes from the master key fob on a blank key fob to generate the duplicated key fob, and cause the dispensing mechanism to dispense the duplicated key fob in the key fob dispenser.

In another aspect, the present disclosure is directed to a self-service kiosk. The self-service kiosk may include a housing and a key fob receptacle disposed in the housing. The key fob receptacle may be configured to receive a master key fob. The self-service kiosk may also include a dispensing mechanism configured to dispense the duplicated key fob into the key fob dispenser. Further, the self-service kiosk may include at least one antenna configured to generate an electromagnetic field. The self-service kiosk may include at least one processor. The at least one processor may be configured to activate the at least one antenna to emit an electromagnetic field. The at least one processor may also be configured to read one or more codes stored on the master key fob upon activation of the master key fob by the electromagnetic field. Further, the at least one processor may be configured to write the one or more codes from the master key fob on a blank key fob to generate the duplicated key fob upon activation of the blank key fob by the electromagnetic field. In addition, the at least one processor may be configured to cause the dispensing mechanism to dispense the duplicated key fob in the key fob dispenser.

DETAILED DESCRIPTION

The disclosed self-service kiosk may include a key fob duplication system that may be configured to write one or more codes of a master key fob onto a blank key fob to create a duplicated key fob. The self-service kiosk may also be configured to dispense the duplicated key fob to the user. Thus the disclosed self-service kiosk, consistent with this disclosure, may allow a user to conveniently duplicate a master key fob and receive a fully programmed duplicate key fob, already containing the one or more codes from the master key fob, via a key manufacturing kiosk that is typically found in a retail location.

Figure 1A:
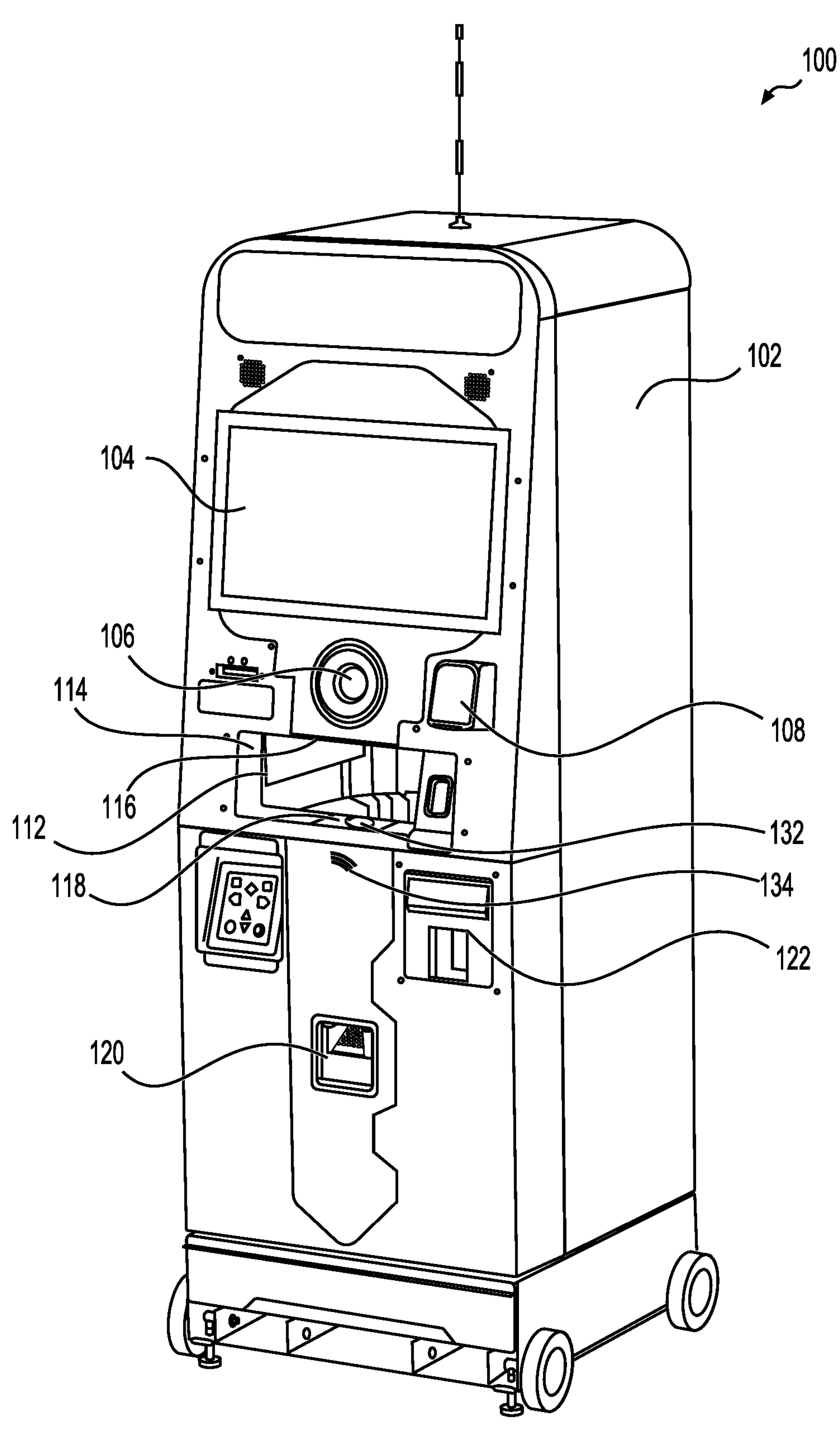
FIG. 1A illustrates an exemplary kiosk, consistent with this disclosure.

FIG. 1A illustrates an exemplary kiosk 100 consistent with this disclosure. Kiosk 100 may be located in a retail location, for example, a grocery or hardware store, shopping mall, or airport, etc. Kiosk 100 may be configured to identify and duplicate keys or other objects related to access control. In one exemplary embodiment, kiosk 100 may be a self-service kiosk that may enable a user to perform a key or key fob duplication without requiring assistance from another person (e.g., employee) associated with the retail location. Kiosk 100 may include housing 102 that may enclose one or more components of kiosk 100. Kiosk 100 may also include display 104, key insertion slot 106, payment capture device 108, viewing window 112, camera 116, key fob reader 118, duplicate key dispenser 120, and key fob dispenser 122.

Display 104 may be positioned anywhere on kiosk 100. Display 104 may include a conventional display device, for example, an LCD screen, an LED screen, a cathode ray tube screen, etc. In some exemplary embodiments, display 104 may be configured to display a graphical user interface, including instructions, advertising, and/or other information. In some exemplary embodiments, display 104 may additionally or alternatively include a touch screen device configured to receive one or more inputs from a user. Thus, for example, a graphical user interface displayed on display 104 may allow a user to provide additional information regarding the object, key, or key fob to be duplicated and/or additional information about the user, accept or reject a displayed price, and/or request help on using kiosk 100. In some exemplary embodiments, display 104 may be configured to display a virtual keyboard or numeric keypad, which may allow a user to enter payment information, address information, and/or other information associated with duplicating a key or a master key fob.

Key insertion slot 106 may be configured to allow a user to insert the shank of a physical key that the user wishes to duplicate. For example, display 104 may display instructions to the user to insert the shank of a key into key insertion slot 106. Kiosk 100 may include one or more sensors configured to detect insertion of the shank into key insertion slot 106. Kiosk 100 may also include one or more mechanical clamps, grasping devices, etc., configured to align the shank so that the shank may be fully insertable into key insertion slot 106 until a head of the key abuts on a surface of housing 102 of kiosk 100. Further, kiosk 100 may include one or more imaging devices and/or one or more lighting devices within housing 102 of kiosk 100. The one or more imaging devices may include one or more 2D or 3D cameras, video cameras, holographic cameras, or other types of imaging devices. The one or more imaging devices may be configured to capture images of, for example, top side, bottom side, and one or more edges of the shank of a key inserted into key insertion slot 106. It is contemplated that the one or more imaging devices may be configured to capture any number of images of any number of sides of the shank. The one or more imaging devices within housing 102 may be positioned on one or more walls of housing 102. It is also contemplated that the one or more imaging devices within housing 102 may be attached to one or more gantries or carriage devices that may allow the one or more imaging devices to be moved in one or more directions relative to the shank inserted into key insertion slot 106. It is also contemplated that the one or more gantries or carriage devices may include one or more tracks, chains, motors, springs, or other actuator systems configured to move the one or more imaging devices in the one or more directions. The one or more imaging devices may be configured to transmit the one or more captured images of the shank to a server.

The server may be configured to determine a bitting pattern of the key associated with the images received from kiosk 100. In one exemplary embodiment, the server may be configured to determine the bitting pattern based on the images of the shank transmitted from kiosk 100. In another exemplary embodiment, kiosk 100 may include one or more processors, memories, and/or databases and may be configured to determine the bitting patter on the key inserted into key insertion slot 106 without the ness to transmit information to a server.

The bitting pattern, instructions, and/or commands may be provided to key cutting components within kiosk 100. Such key cutting components may include, for example, cutting wheels, edge milling cutters, side milling cutters, drills, saws, laser cutters, etc. The key cutting components within kiosk 100 may be programmed to identify an appropriate key blank and to cut notches or other features into the key blank for duplicating the physical key. Once a duplicate of the physical key has been manufactured, the duplicate key may be dispensed to the user via key dispenser 120.

Kiosk 100 may be equipped with one or more payment mechanisms to allow a user or a user to pay for the key or fob duplication services. In one exemplary embodiment, display 104 of kiosk 100 may be configured to display an image of, for example, a bar code or a QR code in a graphical user interface. An associate at the retail location may be able to scan the bar code or QR code allowing information from the bar code or QR code (e.g., payment information) to be directly imported into the retail location's native payment processing system.

In another exemplary embodiment, one or more payment capture devices 108 associated with kiosk 100 may include, for example, a cash acceptor, a credit or debit card reader, etc. For example, the cash acceptor may be located on an outer surface of housing 102 of kiosk 100. The cash acceptor may be configured to receive currency in the form of bills or coins as payment from a user. In some exemplary embodiments, the payment capture device 108 may be configured to accept other types of payment such as checks or other forms of electronic payment. In some exemplary embodiments, the payment capture device may be configured to receive payment via wireless communication with another electronic device, for example, a mobile phone, a tablet computer, a laptop computer, a remote server, etc.

Kiosk 100 may also include a viewing window 112 that may allow a user to see one or more components located within housing 102. Window 112 may also allow a user to view the operation of various components within kiosk 100 when the user uses kiosk 100 to duplicate a physical key.

Viewing window 112 may be positioned in a recess 114. Recess 114 may define a key fob receptacle 114 configured to receive a master key fob 132. Camera 116 may be positioned on one surface of key fob receptacle 114 and key fob reader 118 may be positioned on another surface of the key fob receptacle 114 opposite camera 116. Camera 116 may be a 2D or 3D camera, video camera, or other type of imaging device. Camera 116 may be configured to capture one or more images of, for example, a master key fob 132 placed by a user on key fob reader 118. Camera 116 may be configured to detect the presence of a master key fob 132 placed on key fob reader 118. For example, when a user places a master key fob 132 on key fob reader 118, one or more processors of kiosk 100 may perform image analysis on the one or more images obtained by camera 116 to detect the presence of the master key fob 132 on key fob reader 118, using various image detection or processing algorithms (e.g., using convolutional neural networks (CNN), scale-invariant feature transform (SIFT), histogram of oriented gradients (HOG) features, or other techniques). In some embodiments, the one or more processors may compare the one or more images obtained by camera 116 with one or more stored images of key fobs to detect the presence of a master key fob 132 on key fob reader 118.

Key fob reader 118 may include an antenna 134. Upon detecting the presence of a master key fob 132, the one or more processors of kiosk 100 may activate the included antenna 134 within key fob reader 118 to emit an electromagnetic field. A master key fob 132 when placed on key fob reader 118 may receive the electromagnetic field and in response, the master key fob 132 may transmit data (e.g., one or more codes) stored on the master key fob 132 to key fob reader 118 and associated hardware. In some embodiments, the one or more processors of kiosk 100 may activate the included antenna 134 within key fob reader 118 to emit an electromagnetic field in response to receiving an input from one or more of the input devices (e.g., touchscreen display 104, I/O device 404). The one or more processors of kiosk 100 may also cause display 104 to display instructions to the user regarding duplication of the master key fob 132. In addition, the one or more processors of kiosk 100 may cause payment capture device 108 to accept payment for duplication of the master key fob 132. The one or more processors of kiosk 100 may also be programmed to activate antenna 240 (e.g., a second antenna, see FIG. 4) to emit an electromagnetic field that may be received by a blank key fob 300 inside of a key fob container 302 (see FIG. 3) within kiosk 100. The data read by key fob reader 118 from a master key fob 132 may be written to blank key fob 300 by key fob writer 414, when blank key fob 300 is activated by the electromagnetic field emitted by antenna 240. It is contemplated that key fob reader 118 and key fob writer 414 may be hardware components with their own associated processors that may be configured to read data (e.g., codes) from master key fob 132 and write the data on blank key fob 300. Alternatively, key fob reader 118 and key fob writer 414 may be implemented as software code or instructions that may be executed by one or more processors of kiosk 100 to read data from master key fob 132 and write the data on blank key fob 300. Further, the one or more processors of kiosk 100 may be configured to release a duplicated key fob 300 via opening 130 (shown in dashed lines) of key fob dispenser 122. Although two antennae have been described above, it is contemplated that in some exemplary embodiments, kiosk 100 may have only one read/write capable antenna (134 or 240) that may be used to emit an electromagnetic field to activate both a master key fob 132 placed on key fob reader 118 and the blank key fob 300. When the one or more processors of kiosk 100 does not detect master key fob 132 in, for example, the one or more images obtained by camera 116, the one or more processors may cause an informational message to be displayed on display 104. For example, an exemplary informational message such as "Object is not a key fob. Please place a key fob on the key fob receptacle" may be displayed on display 104.

Figure 1B:
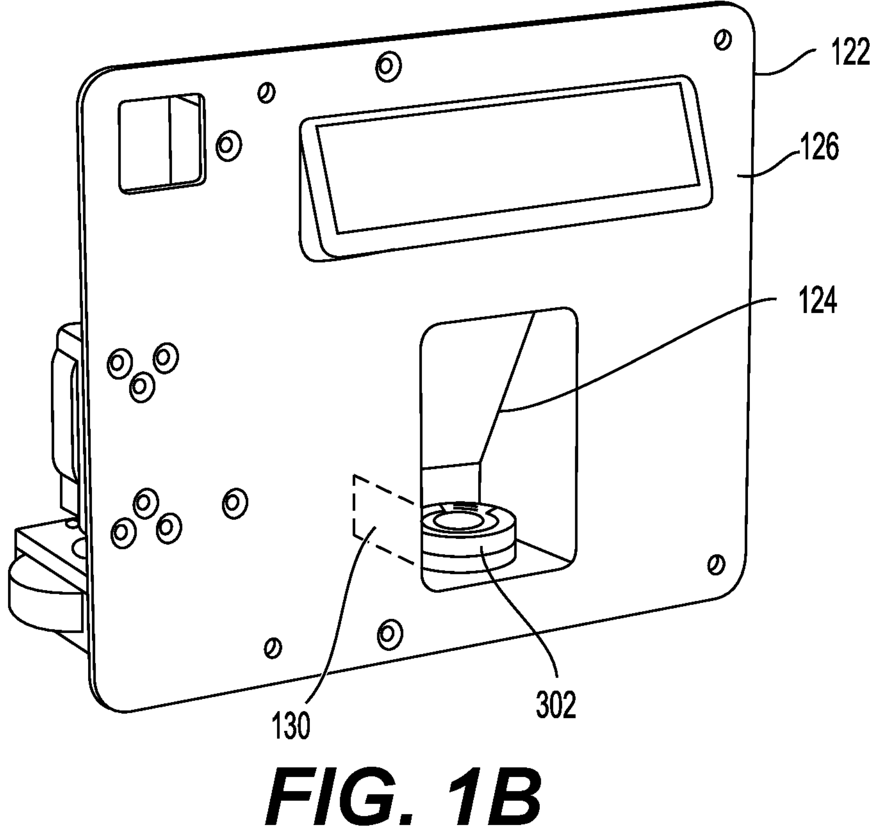
FIG. 1B illustrates a magnified front view of an exemplary key fob dispenser of the exemplary kiosk, consistent with this disclosure.

FIG. 1B illustrates a magnified front view of an exemplary key fob dispenser 122 of kiosk 100. As illustrated in FIG. 1B, key fob dispenser 122 may include a recess 124 (or dispensing slot 124) extending into housing 102 from a front surface 126 of kiosk housing 102. Dispensing slot 124 may include an opening 130 (shown in dashed lines). Key fob dispenser 122 of kiosk 100 may be configured to release one or more key fob containers 302 (see also FIG. 3) through opening 130. It is also contemplated that in some exemplary embodiments the duplicated key fob 300 (without key fob container 302) may be dispensed from kiosk 100 through opening 130.

Figure 3:
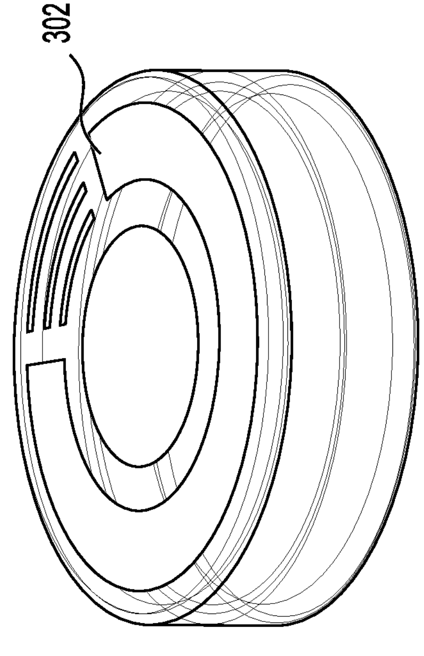
FIG. 3 illustrates an exemplary key fob and key fob container, consistent with this disclosure.
Figure 3:
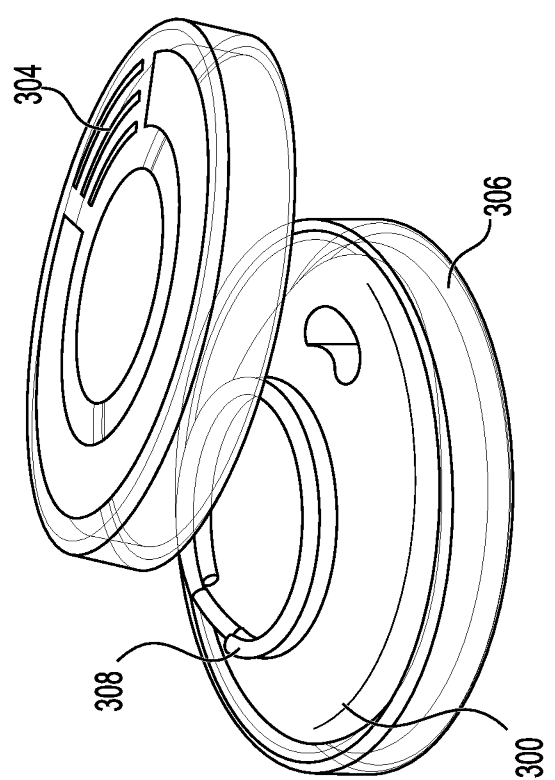
Figure 3:
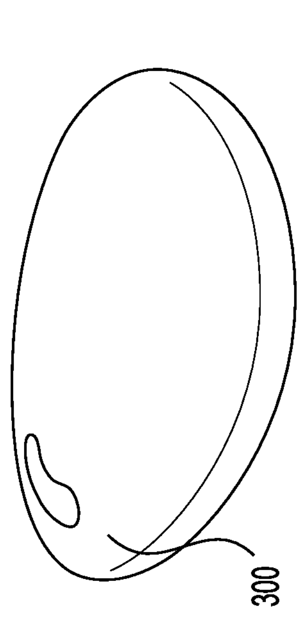

As illustrated in FIG. 3, key fob container 302 may include bottom insertion slot 306 configured to hold key fob 300. Key fob container 302 may also include cover 304. In one exemplary embodiment as illustrated in FIG. 3, key fob container 302 may have a generally circular shape. It is contemplated that key fob container 302 may have any other shape (e.g., square, rectangular, polygonal, elliptical, or any other three dimensional shape). Key fob container 302 may be a two-piece container as illustrated in FIG. 3 or alternatively, it may be a single-piece container that may include one or more slots that may allow a user to extract key fob 300 from key fob container 302. It will be understood that the shapes and sizes of key fob 300 illustrated in FIG. 3 are exemplary, and key fob 300 may have any other shape or size consistent with this disclosure. As further illustrated in FIG. 3, key fob container 302 may include a removable ring 308 inside of the container. Removable ring 308 may be attachable to key fob 300 allowing a user in attaching the duplicated key fob 300 onto a keychain.

Key fob container 302 containing the duplicated key fob 300 may be dispensed from kiosk 100 via key fob dispenser 122. Returning to FIG. 1B, a user may be able to retrieve key fob container 302 from dispensing slot 124 of key fob dispenser 122. It is also contemplated that in some exemplary embodiments the duplicated key fob 300 (without key fob container 302) may be dispensed from kiosk 100 via key fob dispenser 122.

Figure 2A:
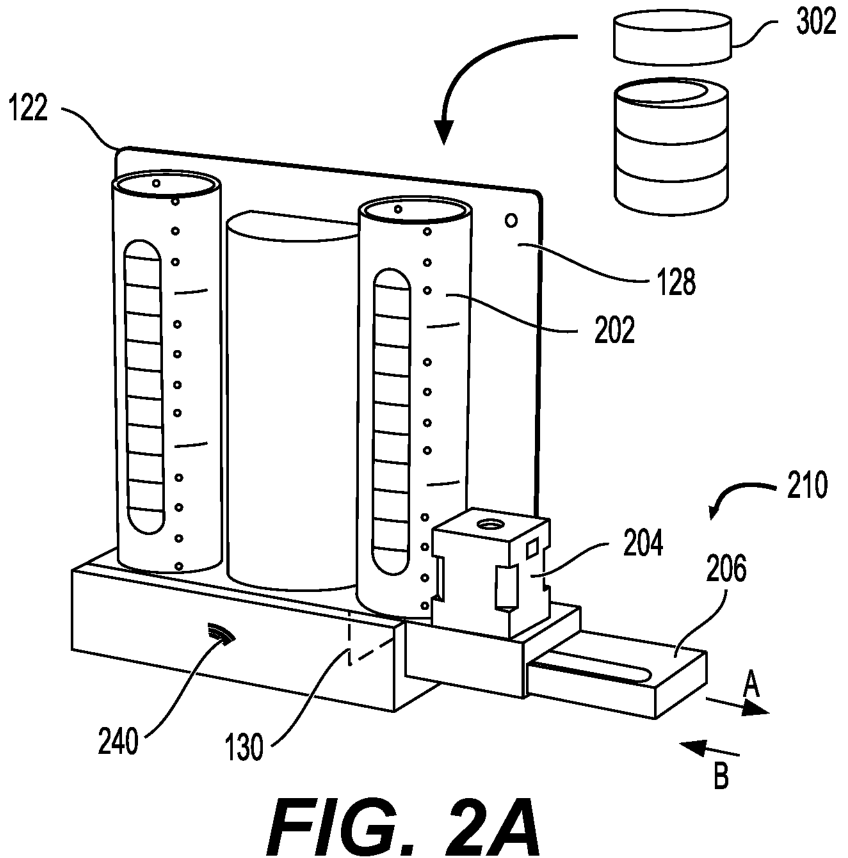
FIG. 2A illustrates an exemplary key fob dispenser, consistent with this disclosure.

FIG. 2A illustrates a rear view of key fob dispenser 122. As illustrated in FIG. 2A, key fob dispenser 122 may include sleeve 202 disposed on surface 128 of housing 102. Surface 128 may face towards an inner volume of housing 102 and may be disposed opposite front surface 126 of housing 102. Sleeve 202 may be configured to hold a plurality of key fob containers 302 that may be stacked on top of each other. In some exemplary embodiments, sleeve 202 may be configured to hold a plurality of blank key fobs 300 that may be stacked on top of each other. Any number of sleeves 202 may be disposed on surface 128. For example, as illustrated in FIG. 2, in one exemplary embodiment, key fob dispenser may be equipped with two sleeves 202. In some embodiments, different sleeves 202 may be included within kiosk 100 that contain different shapes or types of blank key fobs 300 and/or key fob containers 302. It is also contemplated that blank key fobs 300 and/or one or more key fob containers 302 may be provided in a carousel, or other dispensing arrangement instead of via sleeve 202.

As described above, antenna 240 may be configured to write a code associated with a master key fob 132 into one of the blank key fobs 300 located within the stack of key fob containers 302 inside of sleeve(s) 202. Antenna 240 may have any shape or orientation (e.g., curvilinear shape, coil shape, or any other shape) capable of emitting an electromagnetic field.

Each key fob container 302 within sleeve 202 may include a blank (e.g., writeable) key fob 300. One or more processors of kiosk 100 may be configured, via antenna 240 and associated hardware, to write the data and/or information read from a master key fob 132 placed on key fob reader 118 onto key fob 300 located in key fob container 302. It is contemplated that the data and/or information may be written to a blank key fob 300 in a bottom-most key fob container 302 located in sleeve 202 of key fob dispenser 122. Other orientations of sleeve(s) 202 and antenna 240 are possible and will be readily contemplated by one of ordinary skill in the art. As described above, when activated, antenna 240 or an antenna 134 associated with key fob reader 118 may emit an electromagnetic field that may allow the data and/or information read from a master key fob 132 placed on key fob reader 118 to be written to the blank key fob 300 located in bottom-most key fob container 302. For example, properties of the electromagnetic field (e.g., amplitude, frequency, total power) emitted by antenna 240 may be adjusted such that the electromagnetic field emitted by antenna 240 may be configured to only activate a blank key fob 300 present in a bottom-most key fob container 302 without activating blank key fobs 300 present in other key fob containers 302 in sleeve 202. In some embodiments, the electromagnetic field emitted by antenna 240 may be configured to only activate a blank key fob 300 present in a key fob container 302 when the key fob container 302 is positioned in cavity 230 disposed beneath sleeve 202. In some exemplary embodiments in which sleeve 202 stores blank key fobs 300 (without key fob containers 302), the one or more processors of kiosk 100 may be configured, via antenna 240 and associated hardware, to write the data and/or information read from a master key fob 132 placed on key fob reader 118 onto a bottom-most key fob 300 in sleeve 202. For example, in these exemplary embodiments, the electromagnetic field emitted by antenna 240 may be configured to only activate a bottom-most blank key fob 300 in sleeve 202.

Key fob dispenser 122 may also include dispensing mechanism 210 that may include actuator 204 and slider 206. Actuator 204 may be configured to cause a reciprocating movement of slider 206 (e.g., in directions A and B), which in turn may be configured to push a bottom-most key fob container 302 or a bottom-most key fob 300 from sleeve 202 into dispensing slot 124 of key fob dispenser 122 via opening 130.

Figure 2B:
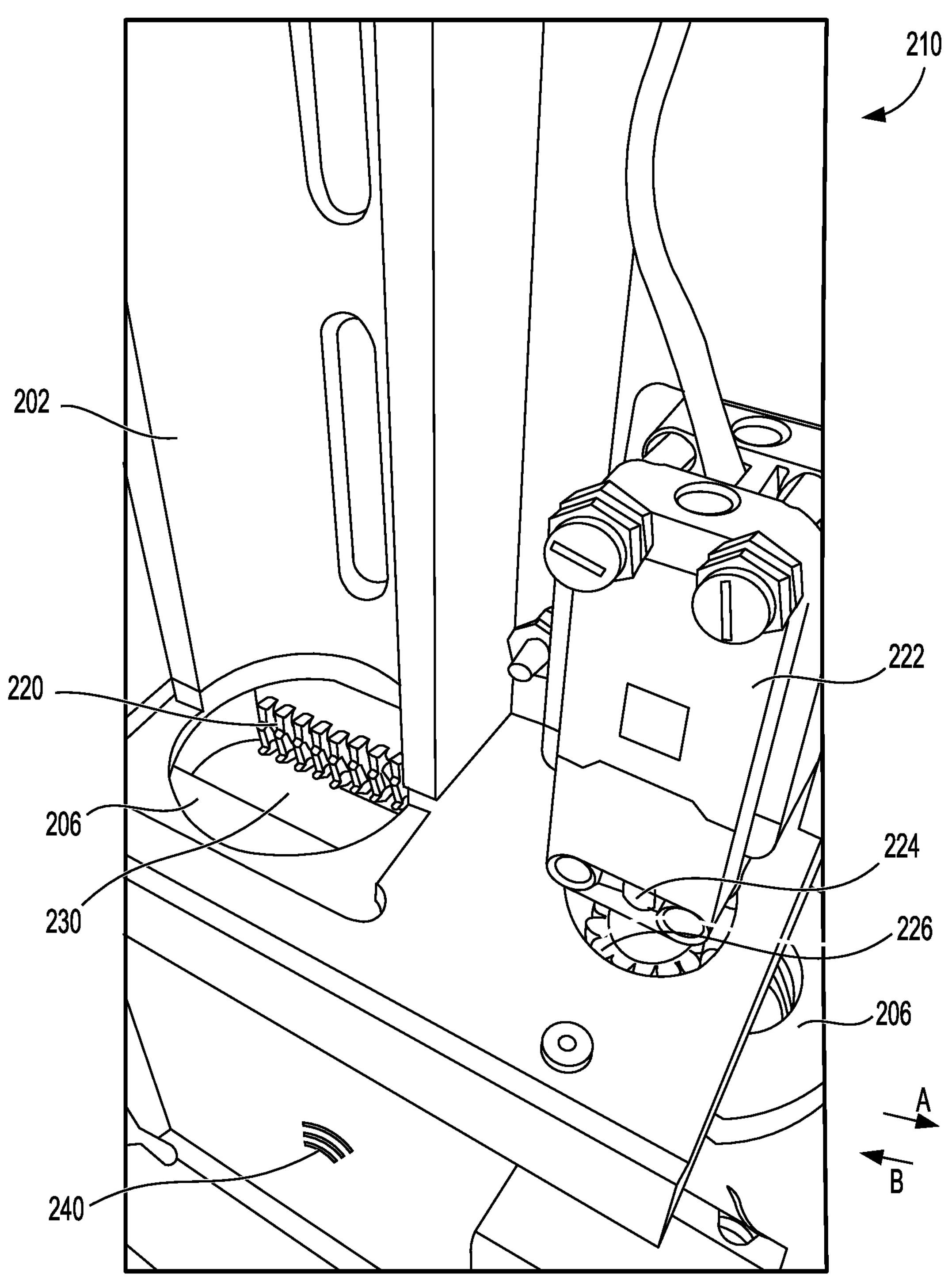
FIG. 2B illustrates a rear view of an exemplary key fob dispenser, consistent with this disclosure.

FIG. 2B illustrates a rear view of an exemplary key fob dispenser 122 consistent with this disclosure. As illustrated in FIG. 2B, in one exemplary embodiment, slider 206 of dispensing mechanism 210 may include one or more teeth 220. Actuator 204 may include motor 222, shaft 224, and gear 226 mounted at one end of shaft 224. Gear 226 may be configured to engage with the one or more teeth 220 forming a rack and pinion type arrangement. Rotation of shaft 224 and gear 226 in a clockwise or counter-clockwise direction may cause slider 206 to move linearly in opposing directions A and B. Thus, for example, rotation of gear 226 in one direction may cause slider 206 to move from a left side towards a right side of FIG. 2B in direction A, and a rotation of gear 226 in an opposite direction may cause slider 206 to reverse its direction of movement to direction B. In operation, the one or more processors of kiosk 100 may cause gear 226 to rotate in one direction, causing slider 206 to move all the way towards the right (e.g., in direction A). Moving slider 206 to its right-most position may expose cavity 230 below a sleeve 202, allowing a bottom-most key fob container 302 or a bottom-most key fob 300 to drop down from a sleeve 202 into cavity 230 and in a position in front of slider 206. The one or more processors of kiosk 100 may then cause gear 226 to rotate in an opposite direction causing slider 206 to move in a direction B, thereby pushing key fob container 302 or key fob 300 from below a sleeve 202 into dispensing slot 124 of key fob dispenser 122 via opening 130. Although a rack and pinion type system (e.g., teeth 220 and gear 226) has been described above, it is contemplated that other types of mechanisms may be used to cause reciprocating movement of slider 206 in directions A and B. Such mechanisms may include without limitation, crankshaft mechanisms, cams, spring loaded actuators, linear actuators, rotational actuators, vacuums, or any other type of device capable of moving slider 206 in directions A and B. In some exemplary embodiments, kiosk 100 may be equipped with pick and place devices including, for example, grippers and/or actuators to retrieve blank key fob 300 or key fob container 302 from a carousel, sleeve, or other dispensing arrangement. The pick and place devices may also be configured to place the blank key fob 300 or key fob container 302 into cavity 230 or at any other location where key fob 300 may be capable of being activated by the electromagnetic field emitted by antenna 134 or antenna 240. The pick and place devices may additionally or alternatively also be configured to place the key fob container 302 containing a duplicated key fob 300 or the duplicated key fob 300 itself (without a key fob container 302) into dispensing slot 124 via opening 130.

Figure 4:
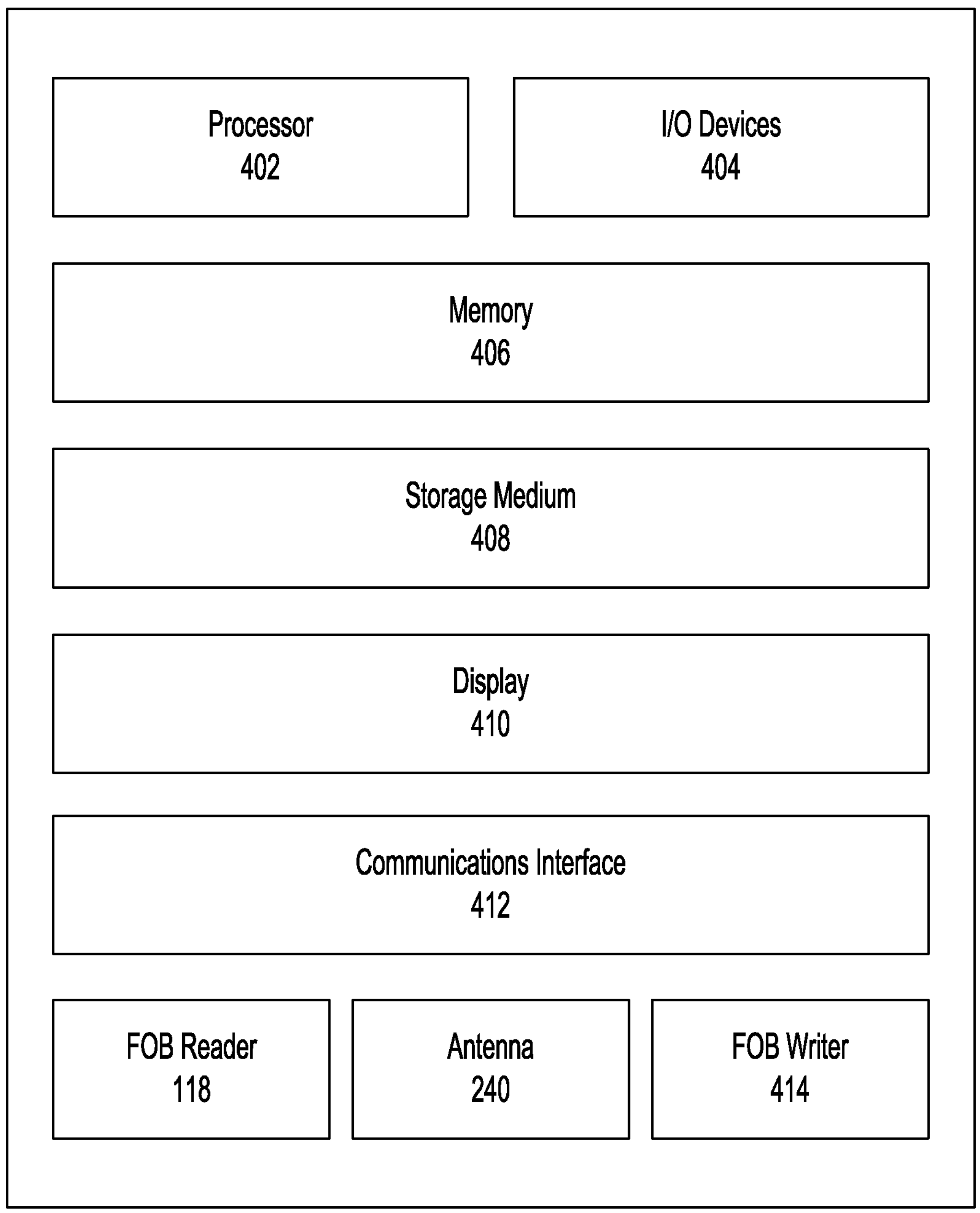
FIG. 4 illustrates an exemplary hardware configuration for a kiosk or a server, consistent with this disclosure.

FIG. 4 illustrates an exemplary hardware configuration 400. Both kiosk 100 and/or any server may include some or all of the components of hardware configuration 400. In one exemplary embodiment, hardware configuration 400 may include one or more processors 402, input/output (I/O) devices 404, memories 406, storage media 408, displays 410, communications interfaces 412, fob reader 118, and/or antenna 240.

Processor 402 may embody a single or multiple microprocessors, digital signal processors (DSPs), etc. I/O devices 404 may include physical keyboards, virtual touch screen keyboards, mice, joysticks, styluses, etc. In some exemplary embodiments, I/O devices 404 may include a microphone (not shown) for providing input to hardware configuration 400 using, for example, voice recognition, speech to text, and/or voice command applications. In other exemplary embodiments, I/O devices 404 may include a telephone keypad and/or a keypad on a touch screen for providing input to hardware configuration 400.

Memory 406 may be configured to store data or one or more instructions and/or software programs that perform functions or operations when executed by the one or more processors 402. For example, memory 406 may include Random Access Memory (RAM) devices, NOR or NAND flash memory devices, Read Only Memory (ROM) devices, etc. Hardware configuration 400 may also include storage medium 408 configured to store data or one or more instructions and/or software programs that perform functions or operations when executed by the one or more processors 402. In some exemplary embodiments, storage medium 408 may include hard drives, solid state drives, tape drives, RAID arrays, compact discs (CDs), digital video discs (DVDs), Blu ray discs (BD), etc. Although FIG. 4 shows only one memory 406 and one storage medium 408, hardware configuration 400 may include any number of memories 406 and storage media 408.

Further, although FIG. 4 shows memory 406 and storage medium 408 as part of hardware configuration 400 of kiosk 100, memory 406 and/or storage medium 408 may be located remotely and hardware configuration 400 may be able to access memory 406 and/or storage medium 408 via a network interface, such as the internet.

Displays 410 may be configured to display data and/or information and may be similar and/or identical to display 104 discussed above. Communications interface 412 may allow software and/or data to be transferred between kiosk 100 and other components of hardware configuration 400 located internally or remotely. Examples of communications interface 412 may include a modem, a network interface (e.g., an Ethernet card or a wireless network card), a communications port, a PCMCIA slot and card, a cellular network card, a Bluetooth interface, etc. Communications interface 412 may transfer software and/or data in the form of signals, which may be electronic, electromagnetic, optical, or other signals capable of being transmitted and received by communications interface 412. Communications interface 412 may transmit or receive these signals using wire, cable, fiber optics, radio frequency ("RF") link, and/or other communications channels.

Antenna 240 and/or antenna 134 associated with fob reader 118 each may be RFID antennas configured to emit an electromagnetic field. In some embodiments, each of the foregoing antennae may be configured to generate an electromagnetic field having a low frequency ranging between 125-134 kHz and/or a high frequency of about 13.56 MHz. Kiosk 100 may include one or more radio frequency circuits configured to generate the low and/or high frequency electromagnetic fields. Although specific frequencies have been described above, it is contemplated that the foregoing antennae may be configured to generate electromagnetic fields having any desired frequency.

The disclosed kiosk may provide a simple way for a user to duplicate key fobs using a key duplication kiosk generally available at a retail location without having to find and visit a specialized key fob duplication location such as a vehicle dealership and/or a particular locksmith capable of duplicating key fobs. Thus, the disclosed kiosk may provide advantages such as increased user convenience for duplicating key fobs at a retail location. Further, the disclosed kiosk may enhance the user experience and improve user convenience by dispensing a fully programmed duplicated key fob inside of a key fob container, containing one or more codes retrieved from a master key fob. This reduces customer confusion and frustration, and increases sales without the need for added labor.

It will be apparent to those skilled in the art that various modifications and variations can be made to the disclosed engraving machine. Other embodiments will be apparent to those skilled in the art from consideration of the specification and practice of the disclosed engraving machine. It is intended that the specification and examples be considered as exemplary only, with a true scope being indicated by the following claims and their equivalents.

What is claimed is:

1. A self-service kiosk, comprising:

a housing;

a key fob receptacle disposed in the housing, the key fob receptacle receiving a master key fob;

an imaging device positioned in the key fob receptacle, the imaging device capturing an image of the master key fob placed in the key fob receptacle;

at least one processor of the self-service kiosk receiving the image from the imaging device and generating a confirmation that the master key fob is in the key fob receptacle by applying one or more image processing algorithms to the image;

a key fob programmer including a key fob reader and a key fob writer, the key fob programmer activating the key fob reader upon receiving the confirmation that the master key fob is in the key fob receptacle, reading one or more codes stored on the master key fob, and writing the one or more codes from the master key fob on a blank key fob to generate a duplicated key fob using the key fob writer; and a key fob dispenser, including a dispensing mechanism dispensing the duplicated key fob into a dispensing slot.

2. The self-service kiosk of claim 1, wherein the imaging device is positioned on a first surface of the key fob receptacle; and the key fob receptacle includes a second surface for receiving the master key fob, the second surface being disposed opposite the first surface.

3. The self-service kiosk of claim 1, the key fob reader including a first antenna configured to emit an electromagnetic field, wherein the at least one processor is configured to read the one or more codes stored on the master key fob upon activation of the master key fob by the electromagnetic field.

4. The self-service kiosk of claim 1, further including:

a second antenna configured to emit an electromagnetic field, wherein the at least one processor is configured to write the one or more codes on the blank key fob upon activation of the blank key fob by the electromagnetic field generated by the second antenna.

5. The self-service kiosk of claim 1, wherein the blank key fob is enclosed within a key fob container, and the at least one processor is configured to cause the dispensing mechanism to dispense the key fob container in the dispensing slot.

6. The self-service kiosk of claim 5, wherein the key fob container includes a ring configured to be attached to the duplicated key fob.

7. The self-service kiosk of claim 5, wherein the dispensing mechanism includes:

a slider configured to push the key fob container into the dispensing slot; and an actuator configured to cause reciprocating movement of the slider.

8. The self-service kiosk of claim 7, wherein the slider includes a plurality of teeth.

9. The self-service kiosk of claim 8, wherein the actuator includes:

a gear configured to engage with the plurality of teeth of the slider; and a motor configured to rotate the gear.

10. The self-service kiosk of claim 1, further including at least one sleeve configured to hold a stack of key fob containers, wherein the key fob writer writes the one or more codes to only a bottom-most key fob container of the stack of key fob containers.

11. The self-service kiosk of claim 10, further including:

a cavity disposed below the at least one sleeve and configured to receive the bottom-most key fob container from the stack of key fob containers; and a slider configured to cover the cavity.

12. The self-service kiosk of claim 11, wherein upon receiving the confirmation that the master key fob is in the key fob receptacle, the at least one processor is further configured to:

cause the slider to move away from a top of the cavity allowing the bottom-most key fob container to be received in the cavity.

13. The self-service kiosk of claim 11, further including:

an antenna configured to generate an electromagnetic field, wherein the electromagnetic field generated by the antenna is configured to activate the blank key fob when the blank key fob is positioned in the cavity, and the at least one processor is configured to write the one or more codes on the blank key fob upon activation of the blank key fob.

14. A self-service kiosk, comprising:

a housing;

a key fob receptacle disposed in the housing, the key fob receptacle receiving a master key fob;

at least one antenna configured to generate an electromagnetic field;

at least one processor of the self-service kiosk receiving an image of the master key fob and generating a confirmation that the master key fob is in the key fob receptacle by applying one or more image processing algorithms to the image;

a key fob reader activating the at least one antenna to emit the electromagnetic field in response to receiving the confirmation that the master key fob is in the key fob receptacle and reading one or more codes stored on the master key fob upon activation of the master key fob by the electromagnetic field;

a key fob writer generating a duplicated key fob by writing the one or more codes from the master key fob on a blank key fob upon activation of the blank key fob by the electromagnetic field; and a dispensing mechanism receiving the duplicated key fob and dispensing the duplicated key fob into a dispensing slot.

15. The self-service kiosk of claim 14, wherein the at least one antenna includes a first antenna and a second antenna, and the at least one processor is configured to activate the at least one antenna by:

causing the first antenna to emit a first electromagnetic field configured to activate the master key fob; and causing the second antenna to emit a second electromagnetic field configured to activate the blank key fob.

16. The self-service kiosk of claim 15, wherein the at least one processor is further configured to activate the first antenna upon detecting a presence of the master key fob in the key fob receptacle.

17. The self-service kiosk of claim 14, wherein the electromagnetic field has a frequency ranging between 125-134 kHz or about 13.56 MHz.

18. The self-service kiosk of claim 14, wherein the blank key fob is disposed in a key fob container, and the dispensing mechanism includes:

a slider configured to push the key fob container into the dispensing slot; and an actuator configured to cause reciprocating movement of the slider.

19. The self-service kiosk of claim 18, further including:

at least one sleeve configured to hold a stack of key fob containers; and a cavity disposed below the at least one sleeve and configured to receive the key fob container from the stack of key fob containers.

20. The self-service kiosk of claim 18, further including at least one sleeve configured to hold a stack of key fob containers, wherein the key fob writer writes the one or more codes to only a bottom-most key fob container of the stack of key fob containers.

* * * * *